United States Patent
Kenmochi et al.

(12)

(10) Patent No.: US 6,178,778 B1
(45) Date of Patent: Jan. 30, 2001

(54) METHOD OF STRETCHING AN OPTICAL FIBER PREFORM WITH MONITORING THE DIAMETER AT TWO LOCATIONS

(75) Inventors: Soichiro Kenmochi, Tokyo; Hideo Hirasawa; Tadakatsu Shimada, both of Gunma; Akihiko Suzuki, Tokyo; Waichi Yamamura; Yoshiaki Shimizu, both of Gunma, all of (JP)

(73) Assignee: Shin-Etsu Chemical Co., Ltd., Tokyo (JP)

( * ) Notice: Under 35 U.S.C. 154(b), the term of this patent shall be extended for 0 days.

(21) Appl. No.: 08/987,070

(22) Filed: Dec. 8, 1997

(30) Foreign Application Priority Data

Dec. 9, 1996 (JP) .................................................. 8-328095
Feb. 24, 1997 (JP) .................................................. 9-039400

(51) Int. Cl.<sup>7</sup> .......................... C03B 37/07; C03B 37/025
(52) U.S. Cl. ................................ 65/381; 65/382; 65/491; 65/486
(58) Field of Search ............................. 65/382, 381, 486, 65/491, 485

(56) References Cited

U.S. PATENT DOCUMENTS 4,608,071    8/1986   Yokosawa .

FOREIGN PATENT DOCUMENTS 2307907     6/1997   (GB) .
5-78139  *  3/1993   (JP) ........................................ 65/381

OTHER PUBLICATIONS

Patent Abstracts of Japan, vol. 96., No. 8, Aug. 30, 1996, JP 08 091861A Furukawa Electric Co., Ltd.
Patent Abstract of Japan, vol. 5, No. 58 (C–51), Apr. 21, 1981, JP 56 009231A—NT&T Corp.)—Jan. 30, 1981.
Patent Abstract of Japan, vol. 11, No. 167 (C–425)—May 28, 1987, JP 61 295252A—Dainichi Nippon Cables Ltd.—Dec. 26, 1986.
Patent Abstract of Japan, vol. 5, No. 106 (C–62), Jul. 10, 1981, JP 56 045843A—NT&T Corp.—Apr. 25, 1981.
Patent Abstract of Japan, vol. 4, No. 77 (C–13), Jun. 4, 1980, JP 55 042215A—NT&T Corp.—Mar. 25, 1980.
Patent Abstract of Japan, vol. 6, No. 165 (C–121), Aug. 28, 1982, JP 57 082139A NT&T Corp.—May 22, 1982.
Patent Abstract of Japan, vol. 10, No. 161 (C–352) Jun. 10, 1986, JP 61 014149A Fu jikura Cable Works Ltd.—Jan. 22, 1986.

* cited by examiner

*Primary Examiner*—John Hoffmann
(74) *Attorney, Agent, or Firm*—Reed Smith LLP

(57) ABSTRACT

In the manufacturing of optical fiber preform with excellent accuracy of outer diameter made of the rod as drawn from synthetic quartz ingot, the outer diameter measuring devices 67 and 68 measure the outer diameters of the cone 2 and rod 3 drawn from the ingot 1, and the drawing speed is controlled based on the measured outer diameters. The optical fiber preform manufacturing apparatus that finishes the rod into truly round form without any curve has a rotary holding means 13 and 14 that hold the rod 3 resulting from the heating and drawing of the ingot 1 rotating it in synchronization with the rotation of the ingot 1, a comparison device 18 that outputs a signal after comparing the outer diameter of the cone 2 as measured by the outer diameter measuring device 11 with that of the referential circle, a control device 19 that controls the rotational amount of the rotating device 10, and a control device 20 that controls the rotational amount of the rotary holding device 13 and 14.

1 Claim, 8 Drawing Sheets

US 6,178,778 B1

METHOD OF STRETCHING AN OPTICAL FIBER PREFORM WITH MONITORING THE DIAMETER AT TWO LOCATIONS

BACKGROUND OF THE INVENTION

This invention relates to the manufacturing apparatus and method of the preform that is the raw material rod of the optical fiber used in the fields such as telecommunication.

The optical fiber is manufactured in the following procedures. First, the soot of the quartz as synthesized by the VAD (Vapor Axial Deposition) method is dehydrated and sintered into an ingot of synthetic quartz. This ingot is then heated in a furnace, drawn under heating and reduced in diameter into a rod, namely the preform for optical fiber.

An ingot drawing apparatus is disclosed in the Japanese Patent Provisional Publication No. 7-2539. The ingot is fed from the top of a heating furnace. The rod as drawn under heating condition is taken out from the bottom of the furnace. The diameter of glass rod coming out of the furnace after drawing is measured at a position. Based on the temporal variation in the measured values, the rod diameter after drawing is controlled in compliance with a process model that can compensate for the idle time.

Because the preform for optical fiber that the authors of this invention are going to manufacture uses, as raw materials, far greater diameters of synthetic quartz ingot and the rod after drawing, it is necessary for us to have a larger size of the heating furnace. Such large size of furnace tends to disturb the air current in it and/or the temperature distribution due to the displacement of the ingot. These disturbances having a large influence over the rod diameter of the preform for optical fiber thus manufactured, an attempt to control the drawing rate based on the outer diameter of the rod coming out of the furnace will cause some hunting. This varies the rod diameter cyclically, which brings obstacle to the manufacture of a preform for optical fiber with stable diameter. Further, the disturbance in temperature distribution may sometimes curve the rod or deform its outline into elliptical.

SUMMARY OF THE INVENTION

It is the primary object of this invention to provide a manufacturing method of a preform for optical fiber wherein the diameter of a rod may be controlled exactly when it is drawn from the ingot, the raw material, with a specifically large diameter. The manufacturing method of the preform for optical fiber according to this invention as intended to achieve the primary objective, wherein an ingot from synthetic quartz is passed through a heating furnace to be drawn under heating, is characterized in that the drawing rate can be controlled based on the outer diameter of the ingot measured at least at two positions in said heating furnace.

A further object of the present invention is the provision of a manufacturing apparatus for optical fiber preform wherein the outer diameter of the rod may be controlled exactly when it is drawn from the raw material ingot with specifically large diameter. The manufacturing apparatus for optical fiber preform by this invention contrived to perform the second objective has a heating furnace through which an ingot made of synthetic quartz is passed and heated, a drawing means that draws the ingot in the furnace, at least two outer diameter measuring devices installed in the furnace, and a control means that controls the drawing speed by said drawing means based on at least two values of the outer diameter as measured by said outer diameter measuring devices.

Still a further object of this invention is the provision of a manufacturing apparatus for optical fiber preform wherein the rod drawn from the ingot may be formed into true circularity without being curved or bent. The manufacturing apparatus for optical fiber preform by this invention contrived to perform the third objective has a heating furnace through which a circular ingot made of synthetic quartz is passed and heated, a suspending means to suspend said ingot in said heating furnace, a rotary means accompanying said suspending means that rotates said ingot, a rotary holding means to hold the circular rod as heated and drawn from said ingot rotating it in synchronization with the rotation of said ingot, a drawing means coupled with said rotary holding means that draws out said circular rod, outer diameter measuring devices that measure the outer diameter of a cone formed by the drawing of said ingot, a comparison means that compares the outer diameter of said cone as measured by said outer diameter measuring devices to output a signal, a control means that controls the rotational amount of said rotary means and finally another control means to control the rotational amount of said rotary holding means.

DETAILED EXPLANATION OF THE INVENTION

The manufacturing method for optical fiber preform to attain the first objective of this invention can be implemented by the manufacturing apparatus for optical fiber preform intended to achieve the second objective of this invention. Referring now to drawings for a more complete understanding of the invention, there are illustrated hereunder the most preferred embodiment of the manufacturing apparatus to attain the second objective and the most preferred embodiment of the manufacturing method to achieve the first objective.

Figure 1:
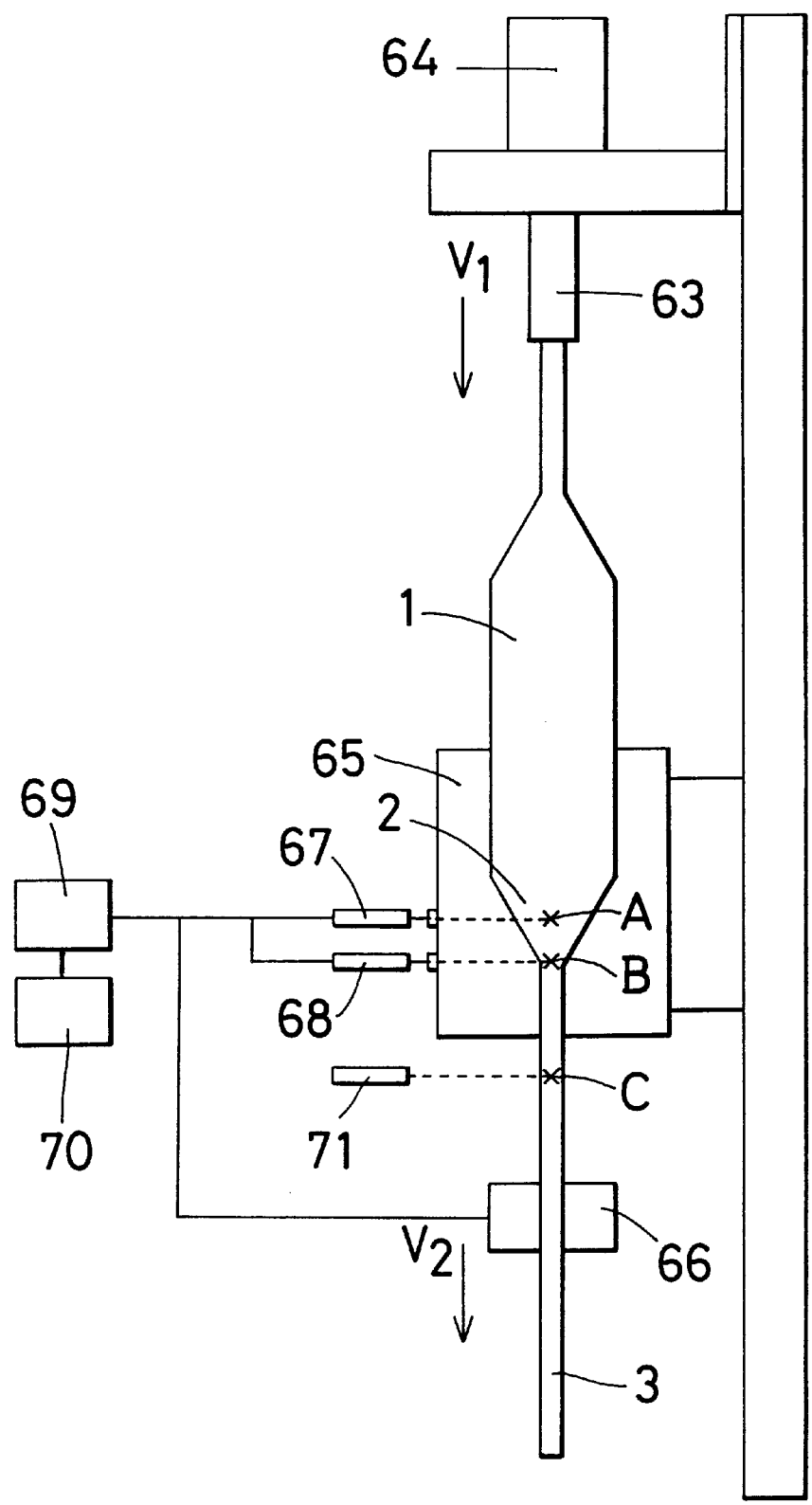
FIG. 1 is a schematic representation showing a working example of a manufacturing apparatus of a preform for optical fiber to which applies this invention.

FIG. 1 depicts an exemplary manufacturing apparatus for optical fiber preform in these embodiments.

The manufacturing apparatus comprises an ingot suspending means 63, a downfeed drive unit 64, a heating furnace 65, a drawing drive unit 66, outer diameter measuring devices provided at two positions 67 and 68, a controller 69 and control circuit 70 that control the drawing drive unit based on the outer diameter measuring devices 67 and 68.

The ingot of raw material 1, synthesized by VAD method and the like, is dimensioned into 100 to 150 mm inclusive in diameter, and 1000 through 1300 mm in length after undergoing the dehydration and sintering processes. The ingot 1 attached to the ingot suspending device 63 at the upper part of the manufacturing apparatus is loaded into the heating furnace 65 with or without rotation thereon at a downfeed speed by means of the downfeed drive unit 64, heated in the heating furnace 65 at about 2000° C. to be partially softened longitudinally. The drawing drive unit 66 installed below the heating furnace 65 draws the softened ingot 1 at a drawing speed to reduce its diameter into a preset rod diameter (30 to 80 mm). The drawing speed of the drawing drive unit 66 is controlled based on the diameter data of the ingot 1 as measured at two positions in the heating furnace 65 by the first and second outer diameter measuring devices 67 and 68. The control of the drawing rate enables to control the outer diameter of the rod 3.

The position A at which the diameter is measured by the first outer diameter measuring device 67 is the position where the ingot 1 is drawn and reduced in diameter most abruptly, that is an almost intermediate position where the ingot 1 as drawn forms a cone 2. The position B at which the diameter is measured by the second outer diameter measuring device 68 is as nearest as possible a position to the measuring position A where the ingot 1 is almost completely drawn, that is, the position where the ingot 1 as drawn into a cone 2 is becoming the rod 3. If the measuring position A goes away too far from the position of the most abrupt drawing, the control of drawing becomes difficult because the diameter of the cone 2 in terms of the variation in drawing speed does not alter at the measuring position. If the measuring position B comes too near to the measuring point A, the rod 3 is drawn further into smaller diameter, which makes it impossible to determine the diameter at the measuring position B from the target diameter for the rod 3. When the outer diameter of the ingot 1 is dimensioned into 100 to 150 mm inclusive, the distance between the measuring positions A and B is preferably to be set within the range of 100 to 300 mm inclusive. The ingot 1 of such a large diameter features 200 to 600 mm in its length as drawn in the heating furnace.

The drawing rate is so controlled that the diameter as measured by the first diameter measuring device 67 at the measuring position A should match with the value a preset in the control circuit 70 and that this set value a should be altered based on the diameter as measured by the second diameter measuring device 68 at the measuring position B.

The drawing speed is controlled by the ordinary PID controller 69. At the measuring position A the variation in diameter emerges instantaneously in terms of the variation in drawing speed and the lag time is short. Therefore, the diameter of the cone 2 can be maintained constant. Further, the diameter of the rod 3 as measured at the measuring position B by the outer diameter measuring device 68 is compared with the value b preset in the control circuit 70 by the target rod diameter. The set value b is set 2 to 6 mm larger than the target diameter of rod 3 in due consideration of the further drawing, though very small, of the rod 3 even between the measuring position B and the position C where the drawing completes.

When the diameter measured at the measuring position B is larger than the set value b, the set value b in the control circuit 70 is altered so that the diameter measured at the measuring position A should become smaller correspondingly. In the control circuit 70, the proportionality constant, integration constant and derivative constant suited to the set value b for the PID control are calculated out, the control by the PID controller 69 with these constants accelerates the drawing speed to correct smaller the diameter of the cone 2 at the measuring position A. As a result, the measured value at the measuring position B approaches the set value b, and the diameter of the rod 3 at the measuring position C becomes the target diameter. If the diameter measured at the measuring position B is smaller that the set value b, this latter is modified so that the diameter measured at the measuring position A may become larger, and is so corrected that the proportionality, integration and derivative constants suited to the set value b may be calculated out, the drawing speed may become lower, and the rod diameter at the measuring position A may become larger. This results in that the measured value at the measuring position B comes nearer to the set value b, and the diameter of the rod 3 becomes the target diameter.

Based on the measured value by the second outer diameter measuring device 70, the time interval when changing the set value a of the first outer diameter measuring device 69 is preferably to be not less than the time obtained dividing by the average drawing rate the distance between the measuring position A of the first outer diameter measuring device 69 and the measuring position B of the second outer diameter measuring device 70. If this time interval is shorter than the above time, the drawing speed comes to be changed before the results of the drawing rate as controlled and changed based on the data from the outer diameter measuring device 69 do elicit in the measured value of the outer diameter measuring device 70, increasing or decreasing excessively the drawing rate. This will result in the occurrence of hunting in the control and the cyclic change in the diameter of the rod 3.

Referring also to the drawings, there is hereunder illustrated the most preferred embodiment of the manufacturing apparatus intended to achieve the third objective of this invention.

Figure 2:
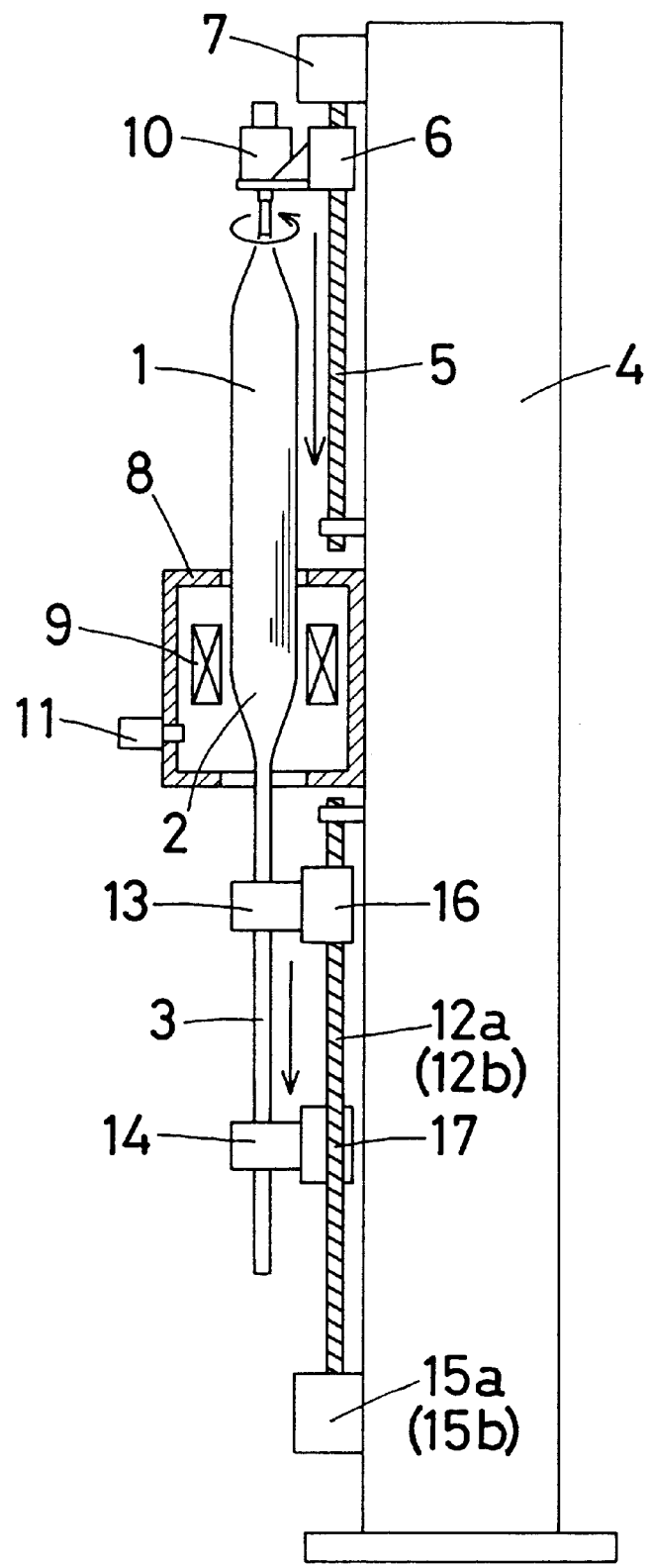
FIG. 2 is an elevational view of another working example of the manufacturing apparatus of a preform for optical fiber to which applies this invention.

FIG. 2 illustrates an exemplary manufacturing apparatus of optical fiber preform in this embodiment. In this embodiment, a means to suspend and downfeed the ingot 1 into a heating furnace 8 is accompanied by such means to rotate the ingot 1 as a motor 7, ball screw 5, scanning device 6 and an eccentric adjust rotating device 10, all of which are mounted on a column 4. Arranged as a means to rotate and hold the circular rod 3 as heated and drawn from the ingot in the heating furnace 8 are a rotating chuck 13 as well as the motor 15a, ball screw 12a and scanning device 16 as the drawing means connected to the chuck that pulls out the circular rod 3 from the heating furnace 8. Further the heating furnace is provided with an outer diameter measuring device 11 that measures the outer diameter of the cone 2 which is midway from the heating and drawing of the ingot 1.

Referring now more particularly to the drawings there are shown the details of this manufacturing apparatus.

Fastened to the column 4 is the ball screw 5 connected to the motor 7. The scanning device 6 screwed into the ball screw 5 mounts the eccentric adjust rotating device 10 that rotates the ingot 1 and at the same time adjusts the whirling produced by the rotational movement of curved ingot 1. The eccentric adjust rotating device 10 connectedly suspends the upper edge of the ingot 1. Arranged in parallel below the heating furnace 8 mounted on the column 4 are two motors 15a and 15b (added in the drawing). Screwed into the ball screw 12a connected with the motor 15a is the scanning device 16 which is equipped with the rotating chuck 13 that holds the circular rod 3 rotating it in synchronization with the rotation of the ingot 1. Connected to the motor 15b in line with these means is the ball screw 12b into which is screwed the scanning device 17 which mounts the rotating chuck 14. Inside the heating furnace 8 there is an exothermic body 9, mounted on the lateral side of which is the outer diameter measuring device 11 that measures the outer diameter at the position where the ingot 1 is now drawn into a cone 2.

Figure 3:
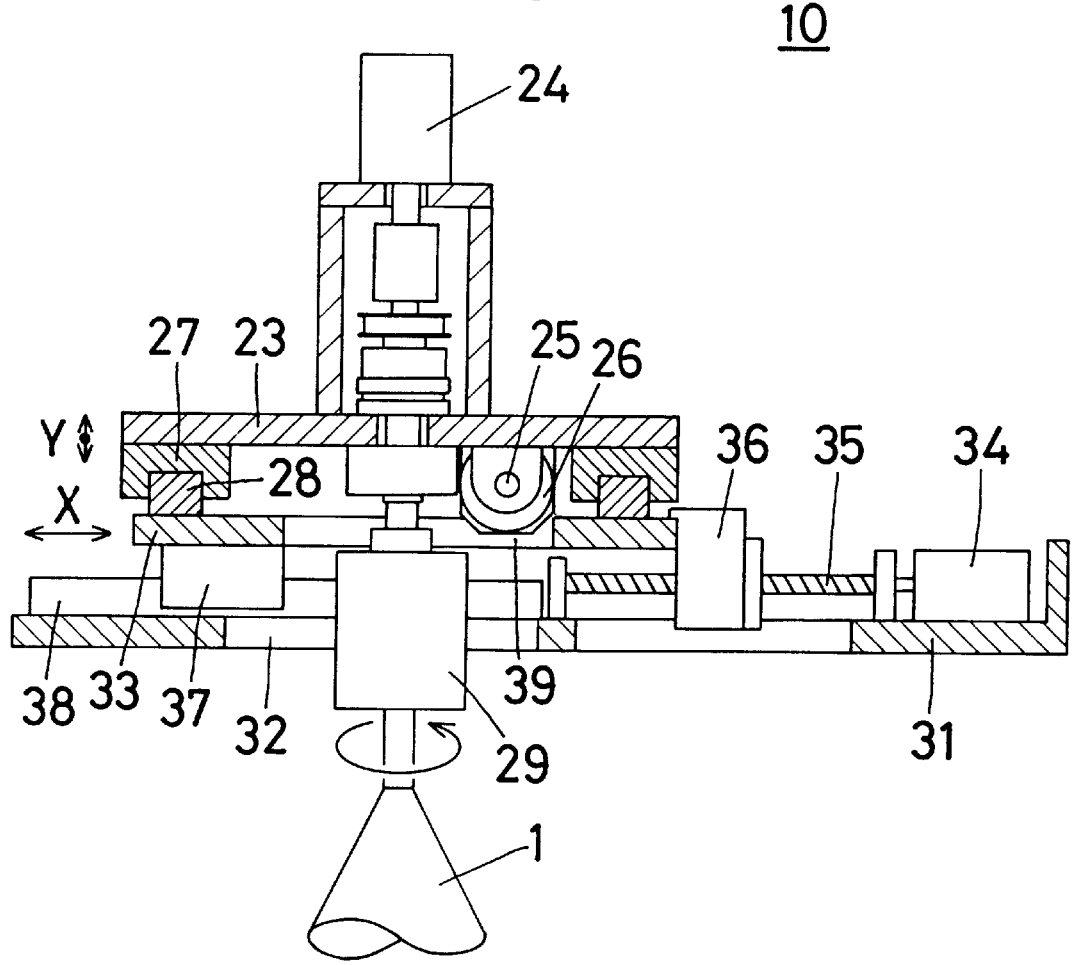
FIG. 3 is a sectional view showing a major part of the manufacturing apparatus of a preform for optical fiber as shown in FIG. 2.

FIG. 3 depicts the construction of the eccentric adjust rotating device 10. A fixing table 31 anchors a guide rail 38 and an X motor 34, connected to which is the ball screw 35. Fitted on the lower surface of the X displace table 33 that displaces along the X-axis are a direct acting bearing 37 and a ball nut 36, which are slidably mounted on the guideline 28 and screwed into the ball screw 35, respectively. The guide rail 28 is fastened on the upper face of the X displace table. Mounted on the lower surface of the Y displace table that displaces in the direction of Y-axis are the direct acting bearing 27 and ball nut 26, which are slidably mounted on the guide rail 28 and screwed into the ball screw 25, respectively. The ball screw 25 is coupled with the Y motor 55 (not shown in FIG. 3, refer to FIG. 5). Furthermore, the X displace table 33 and fixing table 31 have holes 39 and 32, respectively. Mounted on the lower face of the Y displace table 23 is an ingot 1 holding chuck 29, that is pivotably connected with the motor 24.

Figure 4:
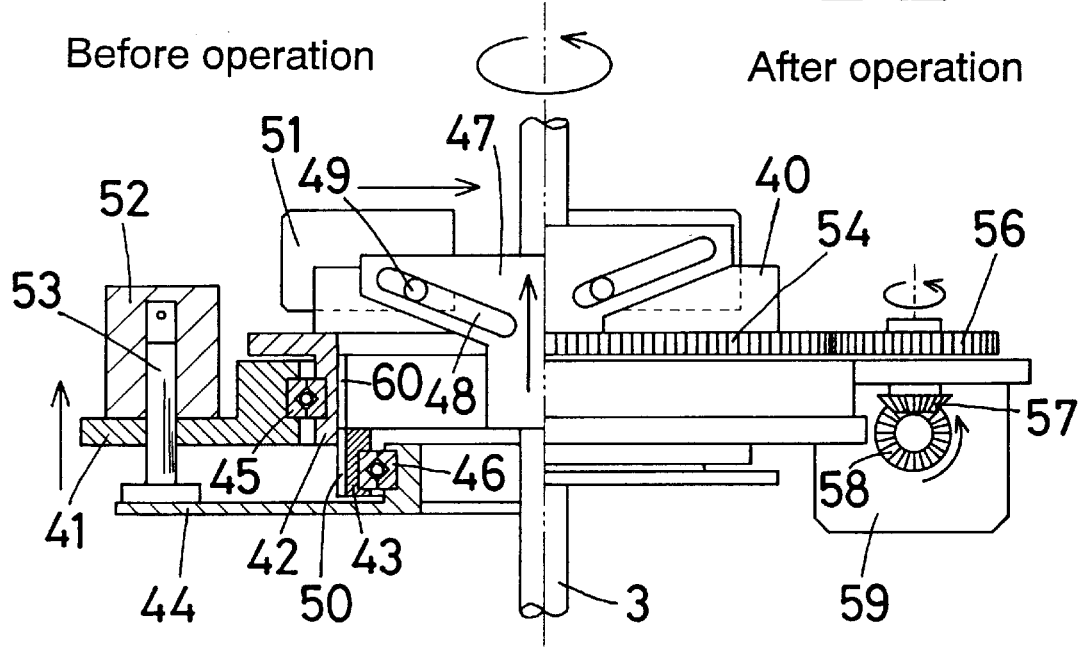
FIG. 4 is a partially sectional view showing another major part of the manufacturing apparatus of a preform for optical fiber as shown in FIG. 2.

FIG. 4 shows up the construction of the rotating chuck 13 and 14. A rotating base 43 is coupled with the fixing base 44 through the intermediary of a rolling bearing 46, and a rotating base 42 is coupled with the fixing base 41 through the intermediary of a rolling bearing 45. The fixing base 41 mounts an air cylinder 52, into which is inserted a piston 53 mounted on the fixing base 44. The rotating base 42 forms partially on its inner face a groove 60, while the rotating base 43 forms, also partially on its outer face, a protrusion 50, which goes fitted all along and into the groove 60 as the rotary base 43 rises up. The fixing base 41 is equipped with the motor 59 and a gear 56, which is linked with the motor 59 through the intermediary of bevel gears 57 and 58. Fitted into the rotating base 42 is the gear 54 that fastens the supporting stand 40, which displaces the holding portion 51 in horizontal direction. The gears 54 and 56 engage with each other. Fastened on the rotating base 43 is a cam plate 47 having a long hole 48, inserted into which is the shaft 49, which is fitted into the holding portion 51.

Figure 5:
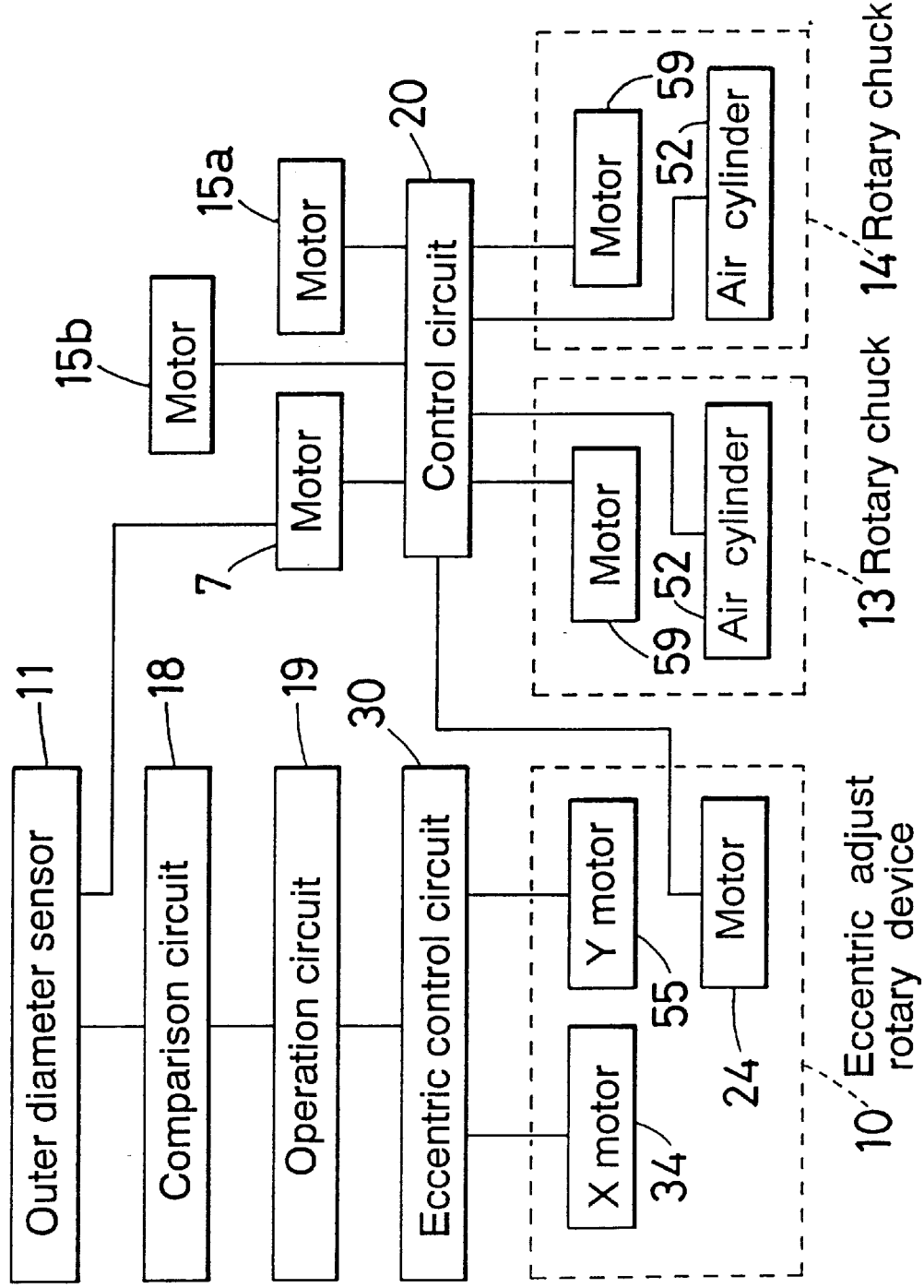
FIG. 5 is a block diagram showing a working example of the manufacturing apparatus of a preform for optical fiber as shown in FIG. 2.

FIG. 5 schematically shows a block diagram of the control system of the manufacturing apparatus of optical fiber preform shown in FIG. 2. Connected to the control circuit 20 are the motor 7, 15a and 15b that drive the ball screws 5, 12a and 12b, and the motor 24 of the eccentric adjust rotating device 10 that rotates the ingot 1. Further connected to this control circuit 20 are the air cylinder 52 that activates the holding portion 51 of the rotating chucks 13 and 14, and the motor 59 that rotates the rotating base 42 of the rotating chucks 13 and 14 in synchronization with the ingot 1.

Connected to the outer diameter measuring device 11 is the comparison circuit 18 that compares the diameter of the cone 2 midway from the heating and drawing of the ingot 1 as measured by said device 11 with the outer diameter of the cone 2 when the ingot 1 is not exposed to any whirling and outputs measured value when the whirling is detected. Connected in turn to this comparison circuit 18 is the operation circuit 19 that computes the whirling amount in X and Y directions from the measured values and that is connected to an eccentric control circuit 30. Connected to this eccentric control circuit 30 are the X motor 34 and Y motor 55 which drive the X displace table 33 and Y displace table 23 so that the whirling of the ingot 1 may be corrected from the value calculated out in the operation circuit 19. Also connected to the control circuit 20 is the output of the outer diameter measuring device 11, which is referred to for the operation of the rotational speed of the motors 15a and 15b.

The manufacturing apparatus of optical fiber preform operates as follows.

When the motor 7 shown in FIG. 2 and the motor 24 for the eccentric adjust rotating device 10 (refer to FIG. 3) are entered into function, the manufacturing apparatus lowers down the scanning device 6 gradually, and the rotating ingot 1 is loaded into the heating furnace 8 to be heated and softened. When the rotating chuck 13 holds the tip of the ingot 1 and the motor 15a is driven, the scanning device 16 comes down thereby drawing the softened ingot 1 is drawn into the cone 2 and then into the rod 3. At this time the rotating chuck 14 is left open. The outer diameter measuring device 11 measures the outer diameter of the rotating cone 2 in synchronization with the rotation of the ingot 1. The value thus measured is compared in the comparison circuit 18 (refer to FIG. 5) with the outer diameter of the cone 2 when there is no whirling. As soon as the whirling is detected, the operation circuit 19 calculates out the whirling amount in X and Y directions. With this calculated value, the eccentric control circuit 30 outputs a signal to the eccentric adjust rotating device 10, drives the X displace table 33 and Y displace table 23 so that the cone 2 may exercise an eccentric movement that corrects the whirling.

The control circuit 20 drives the motor 59 (refer to FIG. 4) of the rotating chuck 13 to rotate the rotating base 42 in synchronization with the ingot 1, activates the air cylinder 52 to raise the cam plate 47, closes the holding portion 51 to hold the rod 3, drives the motor 15a to lower down the scanning device 16 at a speed higher than the lowering speed of the scanning device 6, and finally releases the holding of the rotating chuck 13 after pulling out and drawing the ingot 1. The motor 15b rotates reversely at a suitable timing to leave the scanning device 17 raised and returns the rotating chuck 14 to its upper position, drives the motor 59 of the rotating chuck 14 to rotate the rotating base 42 in synchronization with the ingot 1 and holds the rod 3 as pulled out closing the holding portion 51 before releasing the holding of the rotating chuck 13. Then the control circuit 20 pulls out and draws the ingot 1. Holding and pulling out alternately the rod 3 by the rotating chucks 13 and 14 will thus draw the ingot 1 continuously.

Rotating and drawing the ingot using the preform manufacturing apparatus for optical fiber in the embodiment as shown in FIG. 2 can disperse the force and thermal deviation imposed on the ingot. Therefore, the rod after drawing hardly suffers and bending, and the ingot curved from the first is remedied to be a rod without any curve after the drawing. No corrective transformation is therefore required after the drawing of the ingot, enabling thus to simplify by large the drawing process of the ingot. The outer diameter of the rod after drawing may thus be controlled with high accuracy even when the raw material with larger diameter is to be drawn.

WORKING EXAMPLES

Given hereunder is a description illustrative of the working and comparative examples of the manufacturing apparatus intended to achieve the second objective of this invention by employing the manufacturing method intended to perform the first objective. It is our intention that the invention be not limited by any of the details of the description unless otherwise specified, but rather be construed broadly within the spirit and scope as set out in the accompanying claims.

Working Example 1

The vertical length is 1000 mm of the heating furnace shown in FIG. 1. The outer diameter measuring devices 67 and 68 have been so installed that there be a 150 mm clearance between the measuring positions A and B. To check the diameter of the rod 3 another outer diameter measuring device 71 was installed at a measuring position C, 100 mm below the heating furnace 65. The ingot 1 used in this example is 100 mm in diameter, and 800 mm in length of straight cylindrical portion, which was obtained through the dehydration and sintering of an ingot as synthesized by the VAD process. This ingot was drawn into the rod 3 whose target diameter was 30 mm. The ingot 1 fastened on the suspending device 63 was loaded into the heating furnace 65 set to 2000° C. at the downfeed speed of 20 mm/min by means of the downfeed drive unit 64 and drawn into the rod 3 by the drawing drive unit 66 at 222 mm/min of average drawing speed. The drawing speed $V_2$, which varies constantly, is controlled in terms of the diameter of the rod 3 at the measuring positions A and B. We adopted 32 mm as the set value b at the measuring position B. The set value a of the cone 2 at the measuring position A depending on the difference between the value measured at the measuring position B and the set value b, the drawing speed is controlled to be a speed $V_2$ suited to the set value a. This set value a was changed every 60 seconds.

Figure 6:
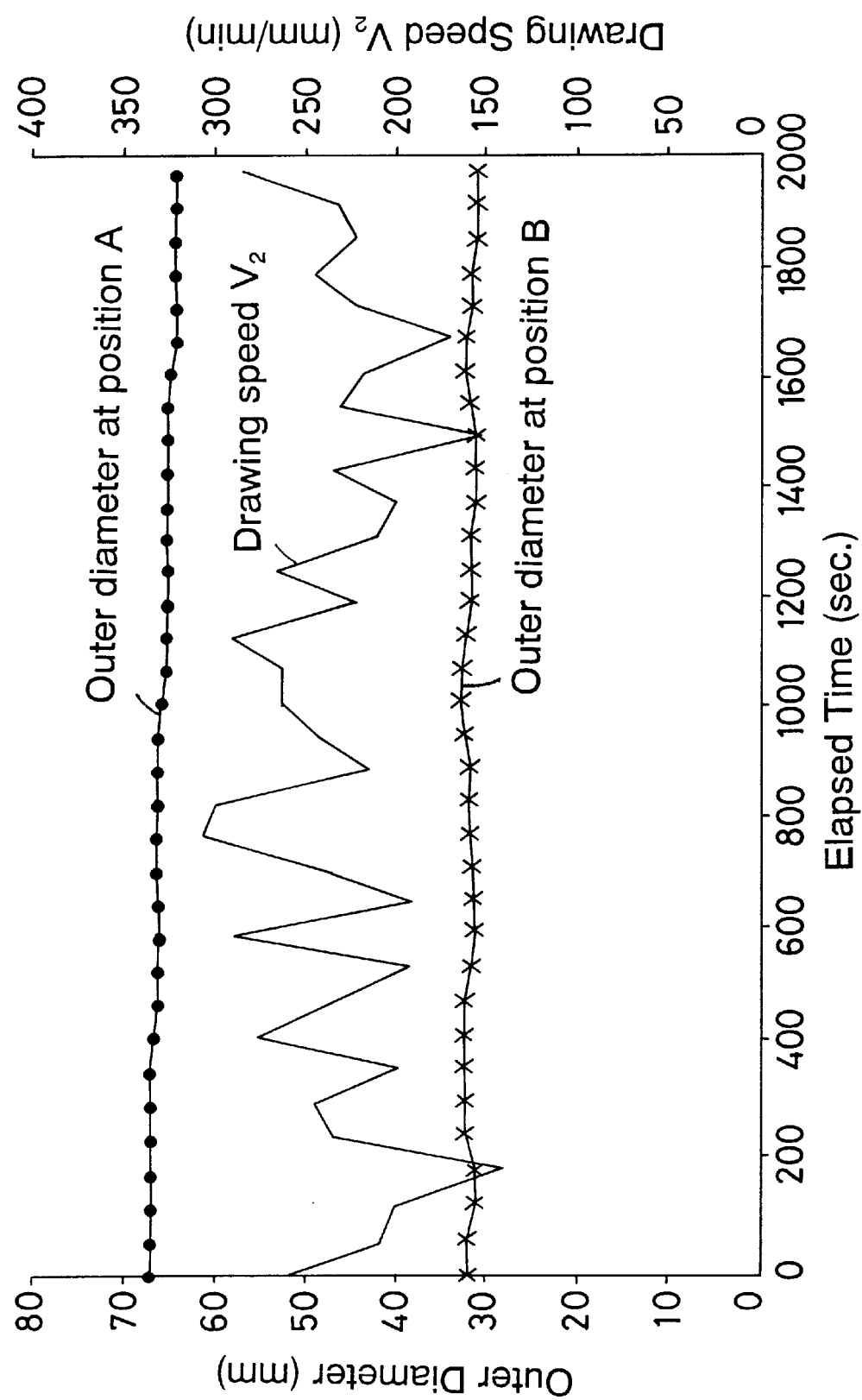
FIG. 6 gives a graph showing an exemplary temporal change in the outer diameter and drawing speed measured at measuring positions A and B in the manufacturing apparatus of a preform for optical fiber as shown in FIG. 1.

FIG. 6 represents the diameters at the measuring positions A and B, and the variation in drawing rate $V_2$ against the elapsed time (seconds). The final diameter of the rod 3 resulted in 30±1 mm.

Working Example 2

In the heating furnace 65 used in Working Example 1, the ingot 1, 150 mm in diameter and 1300 mm in length of straight drum portion was drawn into the rod 3 with 80 mm of target diameter. The feeding speed of the ingot 1 into the furnace was 20 mm/min. The set value b at the measuring position B was set 84 mm, and the value of the set value a was changed every 2.5 minutes in terms of the difference between the value measured at the measuring position B and the set value b to control the drawing speed $V_2$. The average drawing rate was 70.3 mm/min.

Figure 7:
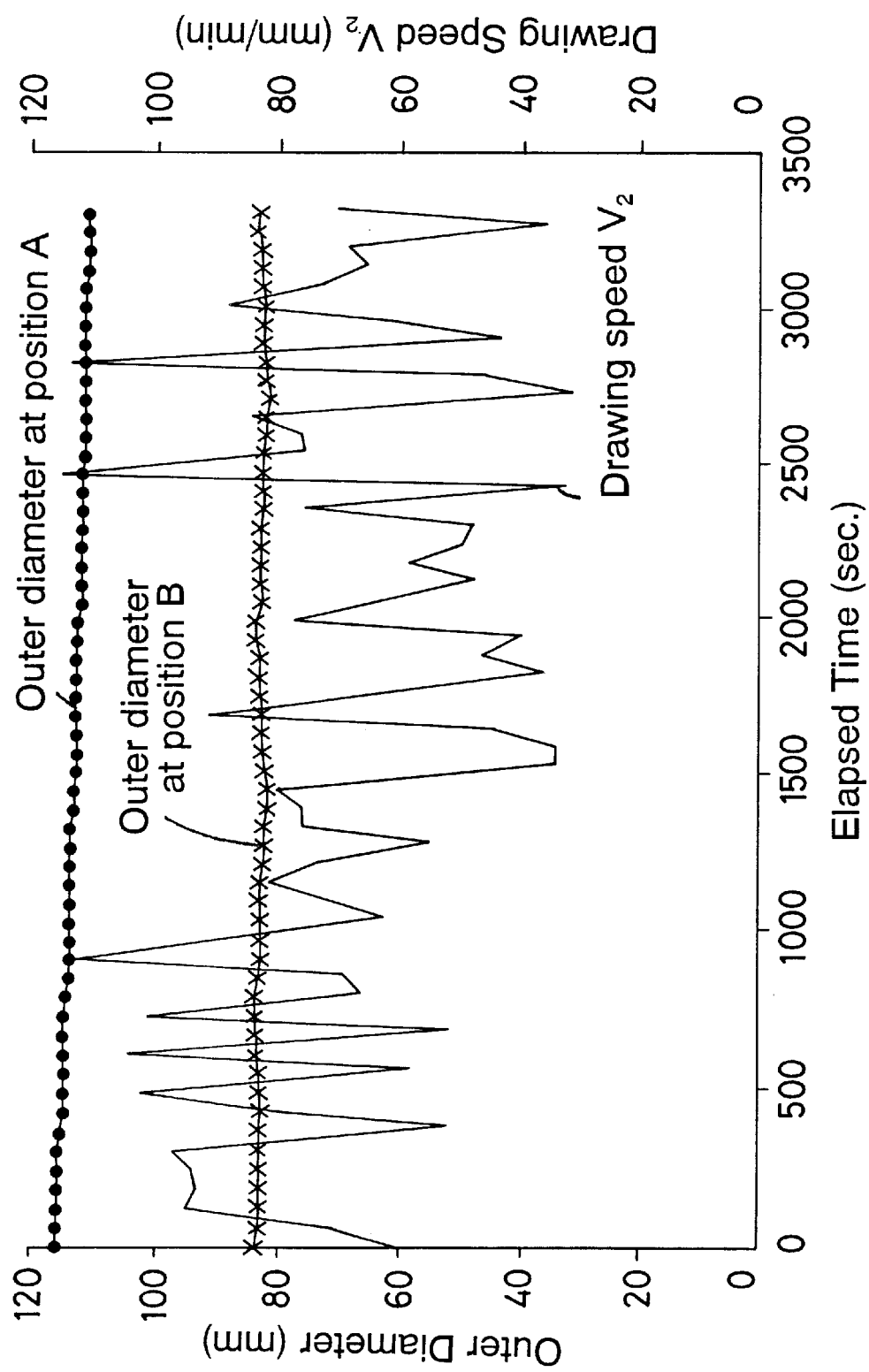
FIG. 7 gives a graph showing another exemplary temporal change in the outer diameter and drawing speed measured at measuring positions A and B in the manufacturing apparatus of a preform for optical fiber as shown in FIG. 1.

As a result the diameters at the measuring positions A and B as well as the drawing speed $V_2$ varied against the elapsed time as shown in FIG. 7. The final diameter of the rod 3 turned out to be 80±2 mm.

Comparative Example

As was the case with Working Example 1, the ingot 1 was drawn into the rod 3 with 30 mm of target diameter in the heating furnace 65 used in Working Example 1. In the manufacturing apparatus of preform for optical fiber shown in FIG. 1, the outer diameter measuring device 67 was employed for measuring the diameter of the cone 2 at the measuring position A, the measured values of which were not used for any control. The outer diameter measuring device 68 was not employed. Only the measured values of the outer diameter measuring device 71 installed at the measuring position C were used to control the drawing speed $V_2$ and the outer diameter of the rod in due consideration of the time lag between the measuring positions A and C.

Figure 8:
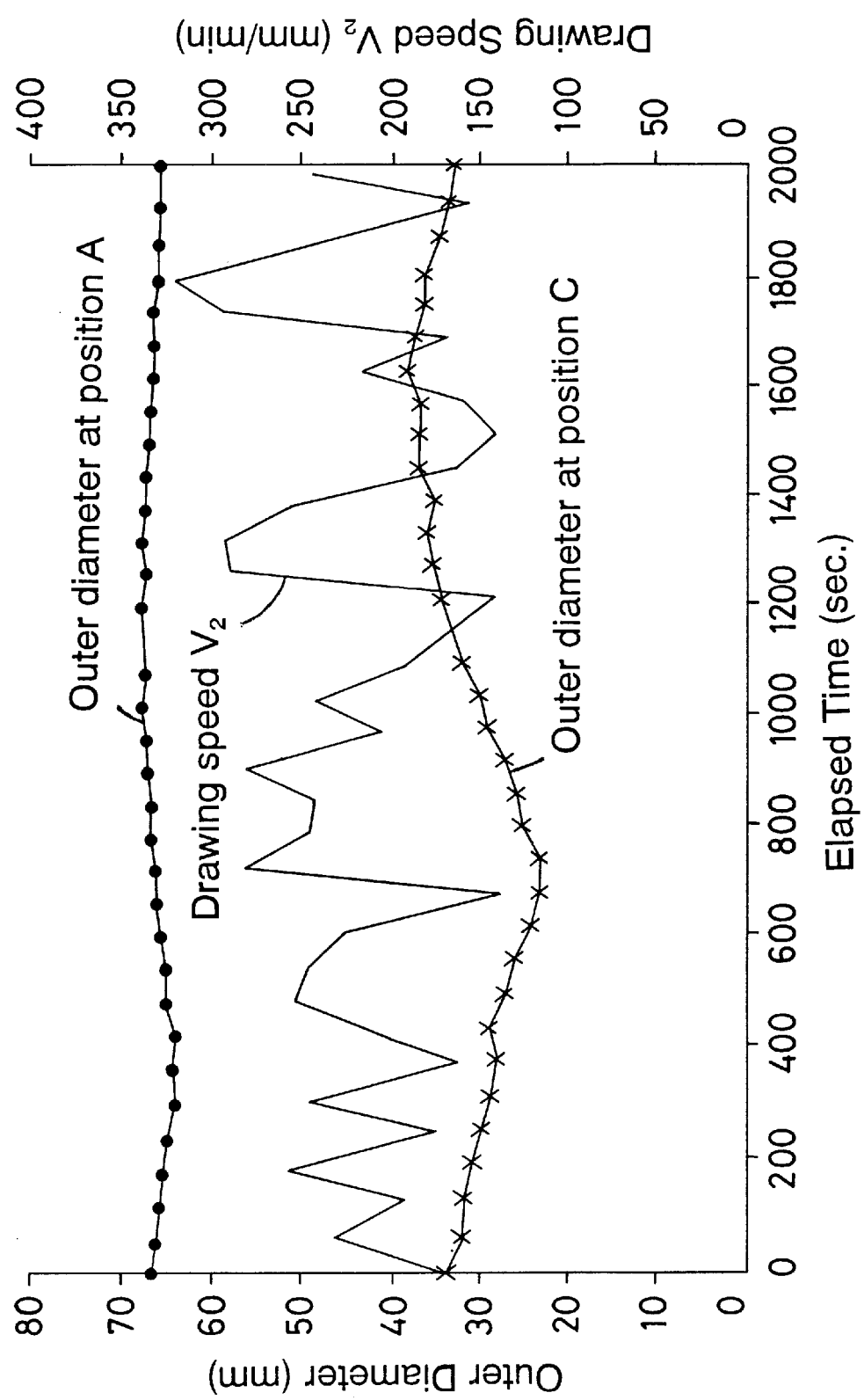
FIG. 8 gives an exemplary graph intended to compare the temporal change in the outer diameter and drawing speed measured at measuring positions A and C in the manufacturing apparatus of a preform for optical fiber as shown in FIG. 1.

FIG. 8 illustrates the results of this control. The drawing speed varied constantly due to the variation in outer diameter at the measuring position C, and the final diameter of the rod 3 varied within the range of 30 mm±8 mm.

What is claimed is:
1. A process for manufacturing an optical fiber preform, comprising:
providing a heating furnace;
providing a synthetic quartz ingot in the heating furnace;
providing a variable-speed means for drawing the optical fiber preform from the synthetic quartz ingot in the heating furnace;
heating the synthetic quartz ingot in the heating furnace to soften it; and
drawing the optical fiber preform in the shape of a rod having a substantially constant, preset diameter using the variable-speed means for drawing,
wherein the variable-speed means for drawing is controlled by a process comprising:
measuring a diameter of the synthetic quartz ingot at a midway point along a decreasing diameter of the ingot caused by the drawing,
comparing the measured diameter of the synthetic quartz ingot at the midway point with a value a, and
adjusting the speed of the variable-speed means for drawing to match the diameter of the synthetic quartz ingot at the midway point with the value a,
wherein the value a is initially preset, and thereafter adjusted by the process comprising:
measuring a diameter of the synthetic quartz ingot at a point at which the ingot is almost completely drawn;
comparing the measured diameter of the synthetic quartz ingot at the point at which the ingot is almost completely drawn with a preset value b;
and adjusting the value a to bring the measured diameter of the synthetic quartz ingot at the point at which the ingot is almost completely drawn closer to preset value b;
wherein a time between measuring the diameter of the synthetic quartz ingot at a point at which the ingot is almost completely drawn and adjusting the value a based on that measured diameter is controlled to be not less than the distance between the midway point and the point at which the ingot is almost completely drawn divided by an average drawing speed.

* * * * *